United States Patent
Hubbard et al.

(10) Patent No.: US 8,635,094 B2
(45) Date of Patent: Jan. 21, 2014

(54) SYSTEM AND METHOD FOR DYNAMICALLY CONFIGURING USER INTERFACE COMPONENTS OF A COLLABORATIVE SPACE BASED ON MAPPING RULES AND USER ROLES

(75) Inventors: Mark William Hubbard, Maple (CA); Ross McKegney, Toronto (CA); Tack Tong, Scarborough (CA); Qi Zhang, Ottawa (CA); Ying Zou, Kingston (CA)

(73) Assignee: International Business Machines Corporation, Armonk, NY (US)

( * ) Notice: Subject to any disclaimer, the term of this patent is extended or adjusted under 35 U.S.C. 154(b) by 3196 days.

(21) Appl. No.: 11/144,121

(22) Filed: Jun. 3, 2005

(65) Prior Publication Data

US 2006/0277089 A1 Dec. 7, 2006

(51) Int. Cl.
*G06Q 10/00* (2012.01)

(52) U.S. Cl.
USPC ........................................................ 705/7.11

(58) Field of Classification Search
USPC ............................................... 705/7.11, 7.27
See application file for complete search history.

(56) References Cited

U.S. PATENT DOCUMENTS

| | | | | |
|---|---|---|---|---|
| 5,446,842 | A * | 8/1995 | Schaeffer et al. | 709/205 |
| 5,790,847 | A * | 8/1998 | Fisk et al. | 707/4 |
| 6,101,489 | A | 8/2000 | Lannert et al. | |
| 6,161,113 | A * | 12/2000 | Mora et al. | 715/234 |
| 6,439,882 | B2 | 8/2002 | Haynes et al. | |
| 6,539,404 | B1 * | 3/2003 | Ouchi | 715/205 |
| 6,622,162 | B2 * | 9/2003 | Kawasaki et al. | 709/207 |
| 6,677,963 | B1 | 1/2004 | Mani et al. | |
| 6,965,751 | B2 * | 11/2005 | Koga et al. | 434/350 |
| 6,968,503 | B1 * | 11/2005 | Chang et al. | 715/202 |
| 7,168,045 | B2 * | 1/2007 | Fliess et al. | 715/771 |
| 7,289,966 | B2 * | 10/2007 | Ouchi | 705/7.13 |
| 7,343,428 | B2 * | 3/2008 | Fletcher et al. | 709/250 |
| 7,346,923 | B2 * | 3/2008 | Atkins et al. | 726/6 |
| 7,814,426 | B2 * | 10/2010 | Huesken et al. | 715/762 |
| 7,900,152 | B2 * | 3/2011 | Nielsen et al. | 715/764 |
| 7,992,134 | B2 * | 8/2011 | Hinchey et al. | 717/126 |
| 8,028,239 | B1 * | 9/2011 | Al-Hilali et al. | 715/762 |
| 8,060,464 | B2 | 11/2011 | Baek | |
| 8,122,084 | B2 * | 2/2012 | Beringer | 709/204 |
| 8,219,434 | B2 * | 7/2012 | Beringer | 705/7.15 |
| 8,335,705 | B2 * | 12/2012 | Ehrler et al. | 705/7.15 |
| 2002/0069083 | A1 * | 6/2002 | Harter et al. | 705/1 |
| 2002/0146675 | A1 * | 10/2002 | Koga et al. | 434/350 |

(Continued)

OTHER PUBLICATIONS van der Woude, Cees, Managing Business Processes with Lotus Workflow and Lotus Workplace LotusSphere04, 2004.*

(Continued)

*Primary Examiner* — Scott L Jarrett
(74) *Attorney, Agent, or Firm* — Steven M. Greenberg, Esq.; Carey, Rodriguez, Greenberg & O'Keefe

(57) ABSTRACT

A method for role-based personalization of a collaborative space can include generating a collaborative space utilizing role information for an interacting user that has been defined by an underlying business process model in a workflow. For example, the step of generating a collaborative space can include parsing the workflow to extract a role model, generating a collaborative space domain model from the role model, selecting a plurality of user interface components based upon the role model, organizing the selected user interface components in the collaborative space, and rendering the collaborative space.

16 Claims, 6 Drawing Sheets

(56) References Cited

U.S. PATENT DOCUMENTS

| | | | |
|---|---|---|---|
| 2003/0055868 A1* | 3/2003 | Fletcher et al. | 709/201 |
| 2003/0090514 A1* | 5/2003 | Cole et al. | 345/744 |
| 2003/0107596 A1 | 6/2003 | Jameson | |
| 2003/0197733 A1 | 10/2003 | Beauchamp et al. | |
| 2004/0044636 A1* | 3/2004 | Casati et al. | 707/1 |
| 2004/0104933 A1* | 6/2004 | Friedrich et al. | 345/751 |
| 2004/0113949 A1 | 6/2004 | Cooper et al. | |
| 2004/0150669 A1 | 8/2004 | Sabiers et al. | |
| 2004/0186750 A1* | 9/2004 | Surbey et al. | 705/4 |
| 2004/0225968 A1 | 11/2004 | Look et al. | |
| 2005/0004825 A1* | 1/2005 | Ehrler et al. | 705/8 |
| 2006/0277089 A1* | 12/2006 | Hubbard et al. | 705/9 |
| 2009/0043621 A1* | 2/2009 | Kershaw | 705/7 |
| 2009/0106733 A1 | 4/2009 | Baek | |
| 2009/0157570 A1* | 6/2009 | Pall et al. | 706/11 |
| 2009/0198546 A1* | 8/2009 | Earle et al. | 705/7 |
| 2010/0153331 A1 | 6/2010 | Baek | |
| 2011/0307788 A1* | 12/2011 | Cheung et al. | 715/731 |
| 2012/0137213 A1* | 5/2012 | Hayler et al. | 715/239 |

OTHER PUBLICATIONS

Hartwell, Steve et al., Customize Lotus Workplace—Building apps is a snap IBM DeveloperWorks, Nov. 17, 2004.*

Security for Microsoft Project Central Microsoft Tech Net, 2000.*

Thomas, Roshan K., Team-based Access Control (TMAC): A Primitive for Applying Role-based Access Controls in Collaborative Environments, RBAC'97. ACM, 1997.*

Tolone, William et al., Access Control in Collaborative Systems ACM Computing Surveys, vol. 37, No. 1, Mar. 2005.*

Tari, Zahir et al., A Role-Based Access Control for Intranet Security IEEE Internet Computing, 1997.*

Monson, Philip et al., Building a Component for IBM Workplace IBM Redpaper, Lotus Software, 2005.*

Zhu, Haibin, Some Issues of Role-Based Collaboration CCECE 2002, IEEE, May 2003.*

Rodriguez, Juan R. et al., IBM WebSphere Portal V5: A Buide for Portlet Application Development IBM Redbooks, Websphere Software, Jan. 2004.*

Pyron, Tim, Using Microsoft Project 2000 Que, 2000.*

IBM Workplace Design 2.5: The fastest way to build components for IBM Workplace environments IBM Software Group, 2005.*

IBM Workplace Live: Workplace, Portal and Collaboration Software—Expanding Your Development Team's Horizons with New Tools, IBM, 2005.*

U.S. Appl. No. 13/419,630, filed Mar. 14, 2012, Baek.

* cited by examiner

SYSTEM AND METHOD FOR DYNAMICALLY CONFIGURING USER INTERFACE COMPONENTS OF A COLLABORATIVE SPACE BASED ON MAPPING RULES AND USER ROLES

BACKGROUND OF THE INVENTION

The present invention relates to the field of collaborative computing and more particularly to the personalization of a desktop user interface in a collaborative space.

Collaborative computing refers to the use by two or more end users of a computing application in order to achieve a common goal. Initially envisioned as a document sharing technology among members of a small workgroup in the corporate environment, collaborative computing has grown today to include a wide variety of technologies arranged strategically to facilitate collaboration among members of a workgroup. No longer merely restricted to document sharing, the modern collaborative environment can include collaborative tools such as document libraries, chat rooms, video conferencing, application sharing, and discussion forums to name only a few.

Currently, it is rare that a goal of any importance is entrusted and reliant upon a single person. In fact, most goals and objectives can be achieved only through the participation of a multiplicity of individuals, each serving a specified role or roles in the process. Consequently, to provide computing tools designed for use only by one of the individuals in the process can be short sighted and can ignore important potential contributions lying among the other individuals involved in the process.

Business processes encapsulate the knowledge of operations and services provided by a business organization. Typically, a workflow represents a business process as a sequence of steps. The workflow describes essential tasks, business roles, and resources required by a process. A role, such as a marketing manager, links individuals to business processes and defines activities that an individual undertakes in order to achieve a desired business objective. Roles generally operate across a number of processes, performing different steps in each process based upon an adequate segregation of duties for the business.

A collaborative space is a collaborative computing environment including a user interface which combines different collaborative tools for use by collaborative interacting users in achieving a common objective. A workplace is a form of a collaborative space that defines information, services and applications to be integrated in the working environment of a user in order to facilitate the performance of business activities by employees. For example, a workplace provides a single point to allow a market manager to create a campaign, check the inventory and e-mail vendors. In this ever changing business environment, business processes are constantly customized to meet requirements for an organization. Individuals are frequently re-assigned to fulfill different tasks. Accordingly, a workplace is needed to support the changing nature of the business domain.

Unfortunately, business workplaces are often designed to fulfill functions of an end-to-end process. In particular, the user interfaces of such workplace applications are based upon the functionality of the system itself and the workplace applications are designed by technologist with regard to meaningful activities specified by business users. For instance, within a commercially available commerce server product, it is known to provide a central location to manage a commerce Web store including product management, store administration, marketing and customer service.

The menu items of the commerce server product generally are defined through a configuration file and are dynamically displayed based upon user roles. Notwithstanding, the content of the configuration file is determined by software developers without references to the underlying business process models.

BRIEF SUMMARY OF THE INVENTION

In one embodiment, a method for role-based personalization of a collaborative space can include generating a collaborative space utilizing role information for an interacting user that has been defined by an underlying business process model in a workflow. For example, the step of generating a collaborative space can include parsing the workflow to extract a role model, generating a collaborative space domain model from the role model, selecting one or more user interface components based upon the role model, organizing the selected user interface components in the collaborative space, and rendering the collaborative space.

The step of generating the collaborative space domain model can include selecting one or more tasks to be performed by the interacting user based upon the role model and incorporating the selected tasks in the collaborative space domain model. The selecting step, in turn, can include defining mapping rules to transform role information aggregated in the role model to user interface components for incorporation in the collaborative space domain model. For instance, the selecting of one or more user interface components can include selecting at least a task user interface component, a work items user interface component, a process list user interface component and a collaborative tools user interface component to be disposed in the collaborative space. Moreover, the selecting step can include selecting a progress status user interface component for the workflow.

The defining of mapping rules can include accepting user-specified mappings between a group of workflow tasks and existing user interface components where existing user interface components exist when the collaborative space is created, but segmenting the workflow to suggest the mapping rules where user interface components do not exist when the collaborative space is created. The segmenting of the workflow can include segmenting the workflow based upon role-assignment by decomposing the workflow into segments at a connector connecting tasks for different roles. Alternatively, the segmenting of the workflow can include segmenting the workflow based upon a control-flow structure by comparing structural features of the workflow to group tasks in the workflow.

A system for role-based personalization of a collaborative space can include one or more user interface components, for instance portlets, disposed in the collaborative space, for instance a workplace. Each user interface component can be selected based upon role information extracted from a workflow. The system also can include a workflow engine coupled to the collaborative space and configured to process the workflow. Finally, the system can include an event engine disposed between the user interface components and the workflow engine. The event engine can include programming to synchronize selected ones of the user interface components responsive to events received from the user interface components in the event engine.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

Embodiments of the present invention provide a method, system and computer program product for dynamically configuring a role-based, personalized collaborative space. In accordance with an embodiment of the present invention, a personalized collaborative space, for example a workplace, can be dynamically generated utilizing role information defined by underlying business process models produced, for instance, by a business process modeler. In this regard, a generated collaborative space can be personalized by associating users with roles using user profiles, and adapting the collaborative environment to the preferences of the associated users, a set of business objectives and user behaviors.

The collaborative space can be a workplace which can be developed using a portal development tool. The workplace can incorporate both user interface components and collaboration mechanisms which can be selected through an analysis of the roles defined within business process models. Subsequently, changes to either the business process models or role assignments can be readily identified by association with affected roles. In consequence, the corresponding workplace can be automatically updated with no need for manual intervention. Thus, the responsiveness to the on-demand business environment can be improved and the cost of maintaining such complex applications can be reduced.

Figure 1:
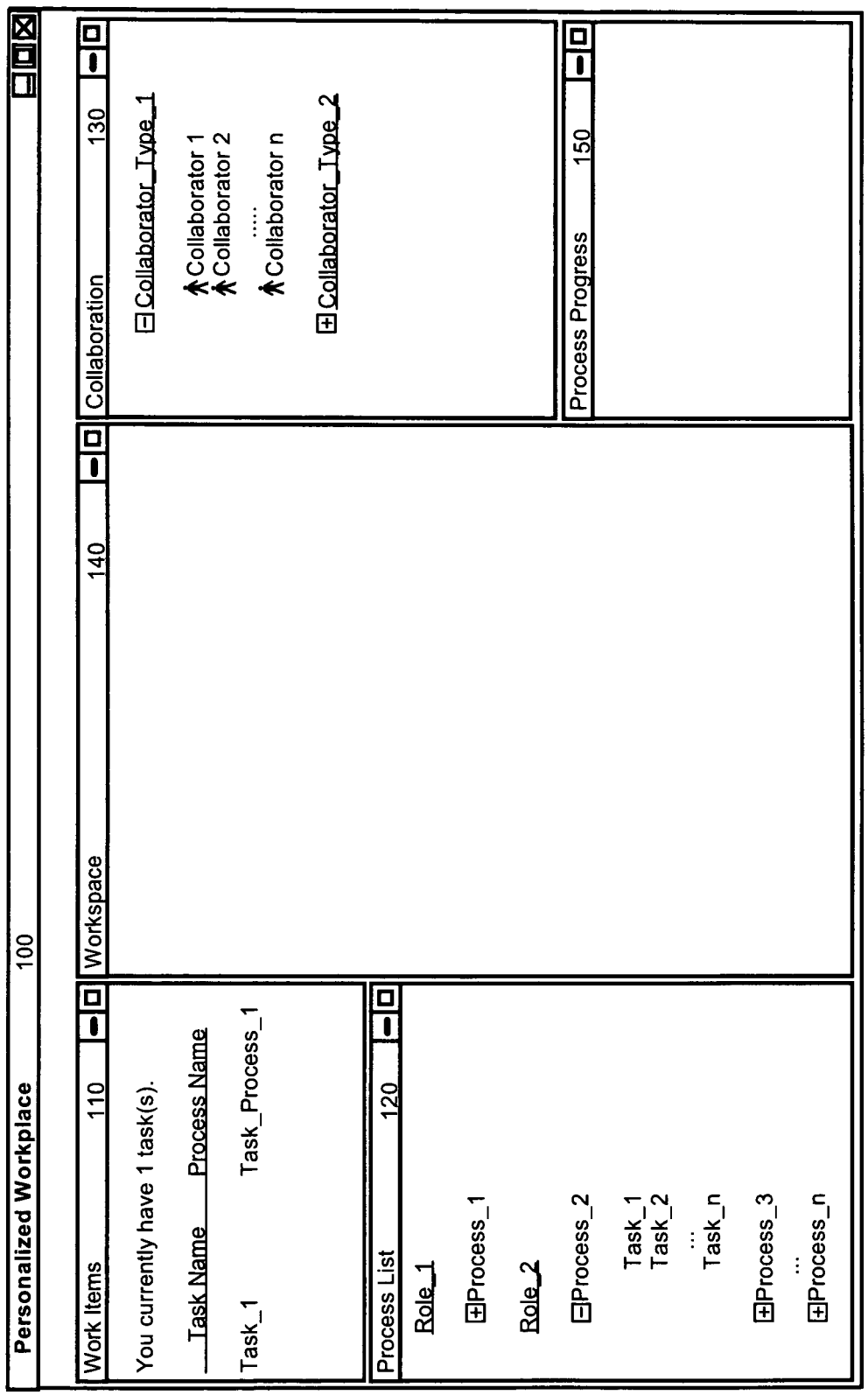
FIG. 1 is a screen shot of a user interface for a collaborative space configured for role-based personalization.

In further illustration, FIG. 1 is a screen shot of a user interface for a collaborative space which has been configured for role-based personalization. Referring to FIG. 1, a personalized workplace 100 can act as a unified single point to access the work items and personal information of a user. The content of the personalized workplace 100 can adapt to tasks defined in a business process and be relevant to a specific a role for the business process. Additionally, to facilitate the achievement of overarching business objectives, the personalized workplace 100 can include other collaborative functions, such as document production, peer collaboration, and progress monitoring.

The content of the personalized workplace 100 can be dependent on a specific, selected business process. To that end, menus in the personalized workplace 100 can be adjusted based upon the underlying business process models to permit an interacting user to focus only upon current tasks through relevant menus and services. Specifically, the personalized workplace 100 can include a work list user interface component 110. The work list user interface component 110 can display a set of work items, each corresponding to a task assigned to the user by an underlying workflow engine. In operation, the user can select a work item in the work list user interface component 110 to begin working on a work item. Once the user has finished working on the work item, the work item can be removed from the work list in the work list user interface component 110.

The personalized workplace 100 further can include a process list user interface component 120: Through the process list user interface component 120, interacting users can initiate a process. When an interacting user has selected a process from the list in the process list user interface component 120, the personalized workplace 100 can notify a coupled workflow engine to create a new process instance of the selected process. The personalized workplace 100 yet further can include a task user interface component 140 that provides a user interface through which an interacting user can access backend applications to achieve a business objective. Finally, the personalized workplace 100 can include a collaboration tools portal 130 which can provide access to collaborative tools for use with other interacting users.

The personalized workplace 100 also can provide a process status user interface component 150 to indicate progress in performing the selected process. For example, the process progress status user interface component 150 can indicate to an interacting user where the interacting user is within the process. A summary of process status, such as starting time and an ending time, also can assist users fulfilling a manager role in tracking the performance of each role. These annotations, coupled with the knowledge of which role performs the task, the data types, the context, and the collaboration requirements can be interpreted to customize workplace components and integrate necessary services.

Figure 2:
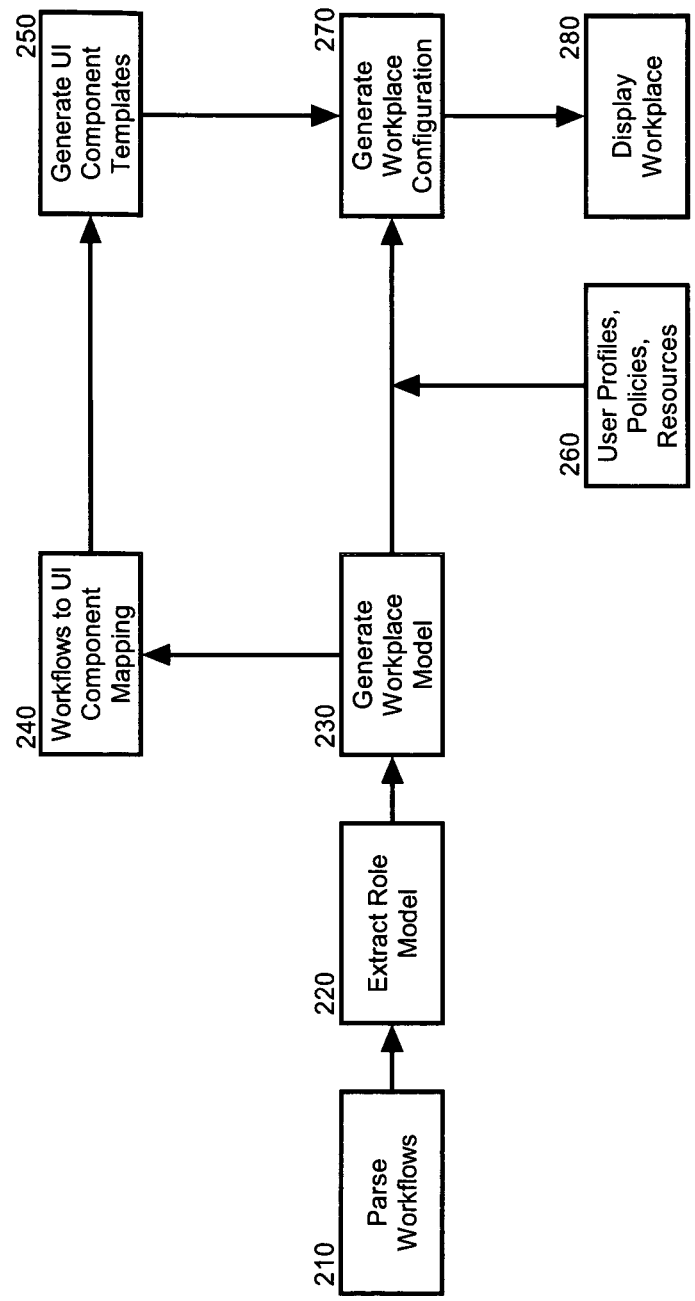
FIG. 2 is a flow chart illustrating a process for configuring a collaborative space for role-based personalization.

To achieve the foregoing role-based personalized workplace user interface, a methodology can be provided which automatically analyzes workflows and generates a role based workplace. Specifically, FIG. 2 is a flow chart illustrating a process for configuring a collaborative space user interface for role-based personalization. Referring to FIG. 2, beginning in block 210 a set of workflows in a business process model can be parsed and in block 220, a role model can be extracted.

The role model can define the rights and responsibilities of roles for the workflow of the business process. Based on the functionality of roles, tasks for the role can be determined. Furthermore, the role model can define additional information for a role to perform a task. Examples include which resources can or cannot be accessed by a user, and the time constraints for completing each task. Optionally, additional information such as task priorities, scheduling information and data and control flow conditions can be extracted or reformed. Finally, the role model also allows a static workplace to be defined for all interacting users having a particular role.

In block 230, a collaborative space domain model can be developed which can represent a meta-model for a template for the collaborative space—for example, a workplace template. The meta-model of a workplace template can be converted to a specific workplace implementation by generating the respective configuration files in block for the specific workplace implementation. Within the configuration files, business process tasks, supporting software components, navigation and context information can be specified. Notably, the workplace model can be refined to contain customization information for the workplace including user profiles, policies and resources.

In block 240, mapping rules can be defined to transform the role information aggregated in the role model to user interface component templates and interface components required in the collaborative space domain model. Subsequently, in block 250 code templates can be generated for use in generating a static collaborative space configuration using user interface components configured for placement within a portal user interface. In block 270, the static workplace configuration can be generated based on the extracted role model and generated workplace model. Additionally, in block 260, the workplace configuration can be associated with a particular user assigned to perform a role based on user profile, access control policies and available resources. Finally, in block 280 the generated workplace can be rendered within a portal user interface.

Figure 3:
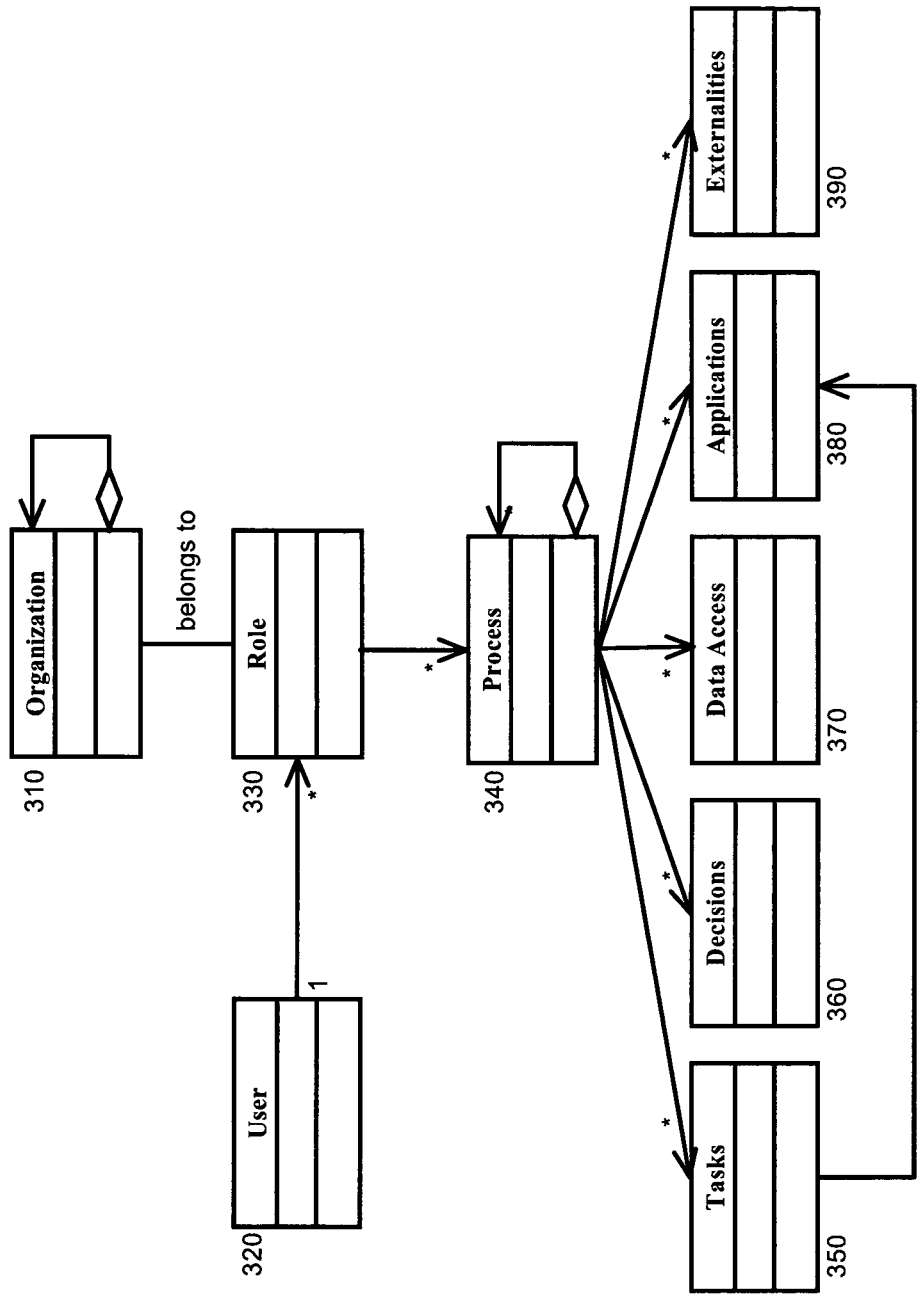
FIG. 3 is an object diagram illustrating an exemplary role model for role-based collaborative space personalization.

The role model can be integral to the personalization of the collaborative space. In more particular illustration, FIG. 3 is an object diagram illustrating an exemplary role model for role-based collaborative space personalization. The object diagram of FIG. 3 can include a user 320 having one or more roles 330 for an organization 310. A role 330 can include one or more processes 340 in a workflow management system. For each process 340 associated with a role 330, the user 320 can perform a number of tasks 350, including decision making 360, accessing workflow relevant data 370, and interacting with applications 380. In addition, in the process 340 a user 320 can contact other roles referred to herein as externalities 390.

The foregoing role model can be recognized as business process models viewed from the role perspective. In this regard, the role model can be viewed as the capture of all role-related information within a business process model. Thus, extracting the role model from a business process model can be performed conventionally by extracting and modifying data defined within process definitions in the business process model.

As it will be understood by the skilled artisan, a portal application follows a standard page structure defined by a host Web portal. Typically, portal pages can be organized in a page hierarchy, based upon the content. Each page can be composed of user interface components. The user interface components, in turn, can be embedded in layout containers each of which can describe the layout of the page. Based upon this information, a collaborative space domain model can be generated to represent the collaborative space as a portal application. Consequently, the generated domain model can allow the specification of business process tasks, supporting components, navigation and context information.

Figure 4:
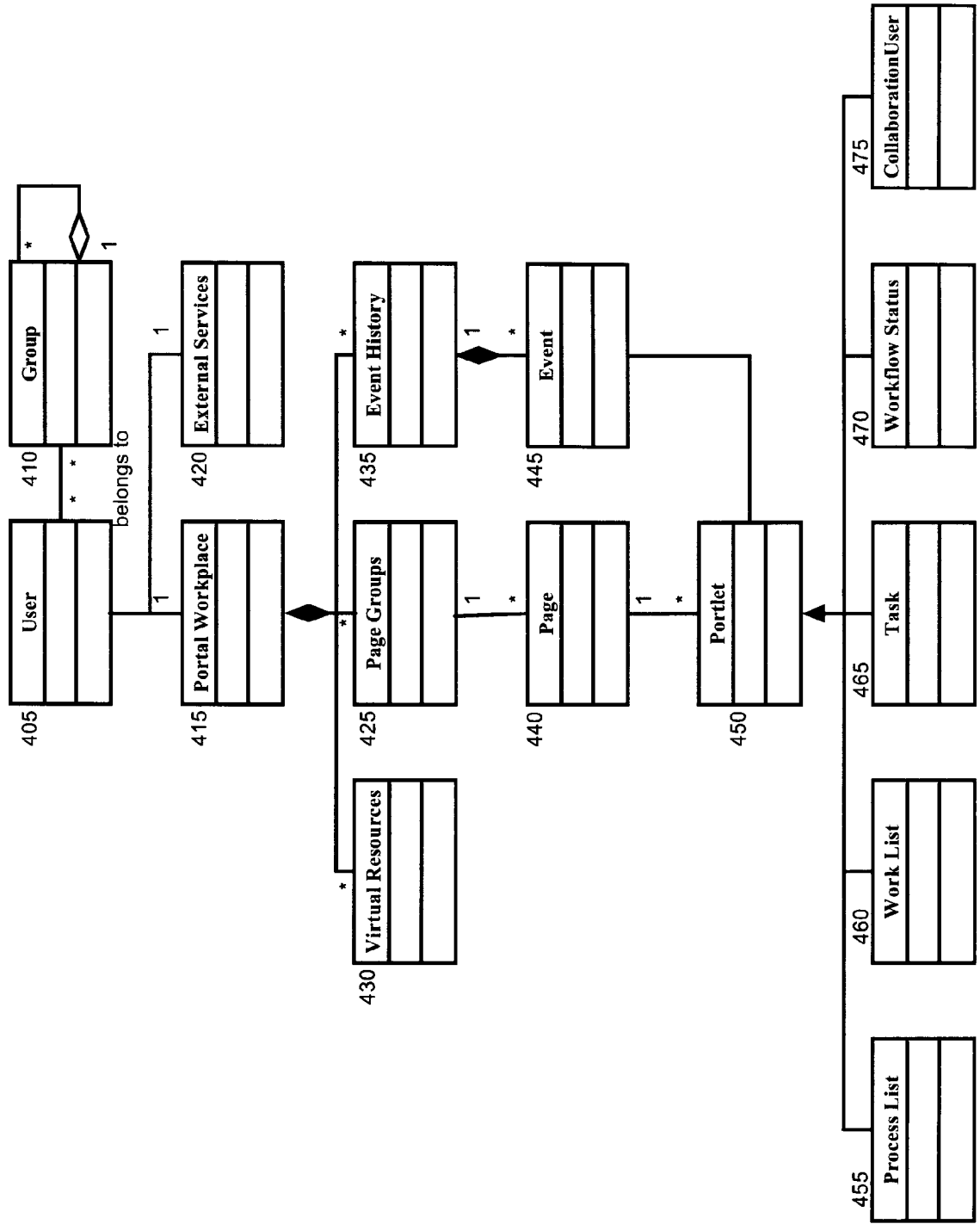
FIG. 4 is an object diagram illustrating an exemplary collaborative space domain model for role-based collaborative space personalization.

In more specific illustration, FIG. 4 is an object diagram illustrating an exemplary collaborative space domain model for role-based collaborative space personalization. As shown in FIG. 4, a user 405 can be a member of several user groups 410. When the user logs on to the portal, a collaborative space, such as a portal workplace 415, can be rendered for the benefit of the user 405. The user 405 also can access available external applications and services 420. In the portal workplace 415, a number of page groups 425 can be provided, which can be rendered in a content browser as tabs that can be selected by the user 405.

Each of the page groups 425 can include one or more pages 440. Optionally, in each of the pages 440, a set of layered containers (not shown) can be defined which can specify the layout of the page 440. Each of the layer containers can include one or more user interface components 450, which can include a process list 455, a work list 460, a task list 465, the process status of a workflow 470 and collaborative tools 475. Generally, the user interface components 450 can be shown as mini-windows within the page 440.

Finally, in addition to the user interface components 450, the portal workplace 415 can incorporate virtual resources 430. Virtual resources 430 typically have two functions: Virtual resources 430 protect sensitive operations that affect the entire portal workplace 415, or specific concepts in the portal workplace 415. Moreover, virtual resources 430 serve as the parent resources for all resource instances in the portal workplace 415. The portal workplace 415 further can maintain an event history 435 of events 445. The events 445 can arise in the course of operation for the user interface components and can be process by the portal workplace 415. The event history 435 can include a logging of previously detected events 445.

As it will be understood, a complex workflow often can be organized in terms of hierarchy for the purpose of documentation. However, a user usually directly performs processes at the lowest level of detail, for example a task. Accordingly, in an embodiment of the invention, the business process hierarchy can be flattened into a sequence of tasks that are conducted in the collaborative space. By comparison, the collaborative space domain model can be populated from information in the role model. Yet, there is no direct relationship between the role model and the collaborative space domain model. Further as the objects in each model do not share similar meanings, and yet further as the structures of both models are different, the transformations between the two models can require incorporating domain knowledge of the collaborative space.

As a result, a set of transformation rules can be defined. Yet, instead of simply mapping a workflow task to a fragment within a user interface component, at least two mapping scenarios can be supported. In the first scenario where existing porlets already exist when the collaborative space is created which implement business tasks and achieve business objectives, a user can specify the mappings between a group of workflow tasks and an existing user interface component. In the second scenario where user interface components do not exist when the collaborative space is created, a workflow segmentation algorithm can be provided to suggest the mappings between a group of workflow tasks and a user interface component. Using the suggested mappings, a skeleton user interface component can be generated.

In particular, the criteria for workflow segmentation can be determined to minimize the overhead and complexity of the communication and coordination among user interface components. Consequently, the following heuristic rules for automatic segmentation of processes can be provided: For example, a first rule can include a segmentation based upon role-assignment. In this rule, a workflow can be decomposed into segments at a connector connecting tasks for different roles. In this regard, based upon the segregation of duties, it is likely that the tasks for different roles belong to different user interface components.

As another example, a second rule can include a segmentation based upon control-flow structure. In this rule, a workflow can be based upon the structure of the control flow. Specifically, the structural features of a workflow can be compared to group tasks. For instance, sequential tasks can be implemented in a single user interface component. However, if a decision leads to three separate branches, the three branches can be treated as three different segments presuming three separate roles for those segments. Likewise, parallel tasks can be implemented in multiple user interface components as well.

Figure 5:
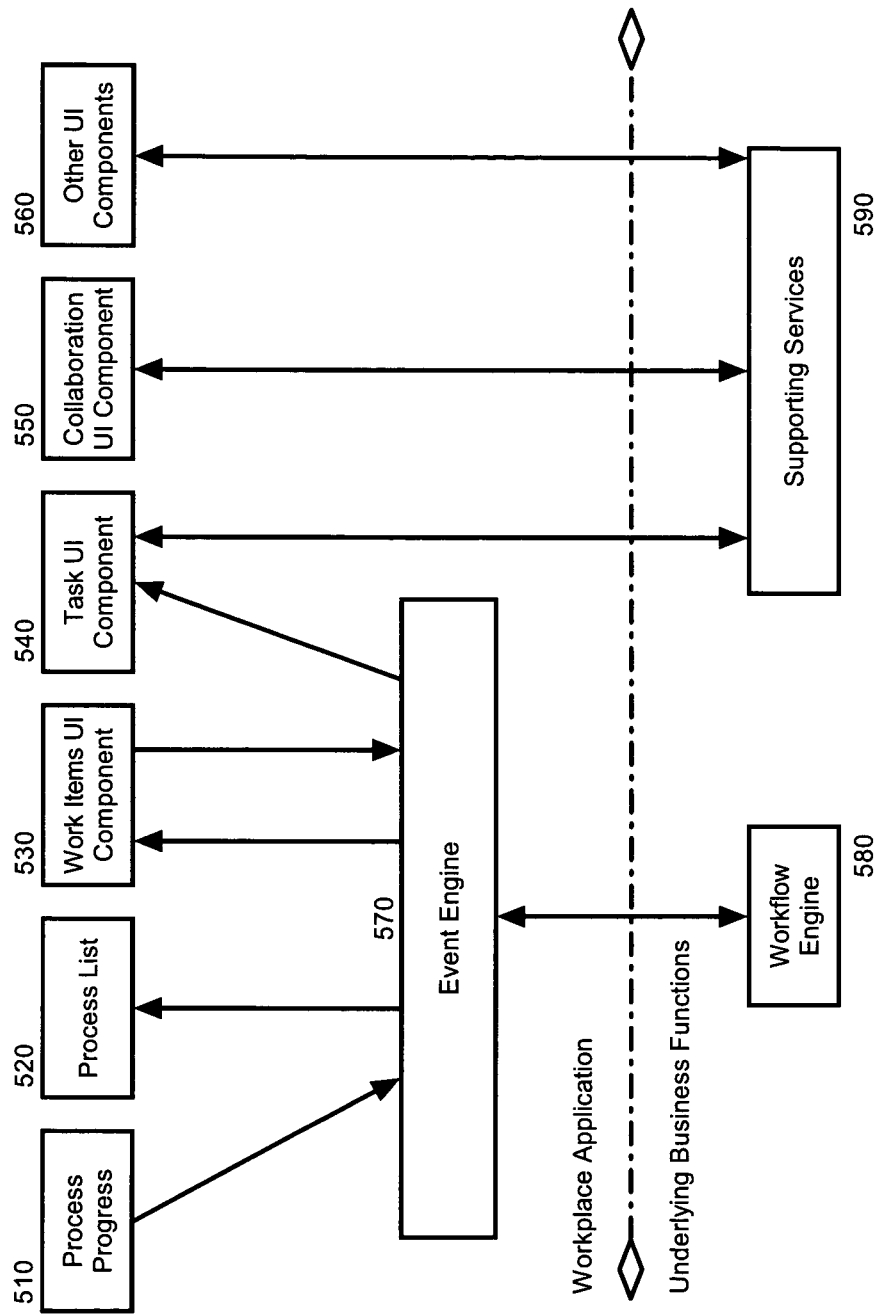
FIG. 5 is a block diagram illustrating a system for role-based personalization of a collaborative space; and, FIG. 6 is a timing diagram illustrating a process for synchronizing a workflow engine in the system of FIG. 5.

The collaborative space displayed in consequence of the extracted role model and the generated collaborative space domain model can serve as the workflow client application for a workflow management system for an organization. In illustration, FIG. 5 is a block diagram illustrating a system for role-based personalization of a collaborative space. As shown in FIG. 5, the collaborative space can include not only a process list 520 and indicia of process progress 510 but also a work items user interface component 530 and task user interface component 540. Also, the collaborative space can include a collaboration user interface component 550 and other various and sundry user interface components 560 supported by external, supporting services 590.

With respect to the work items user interface component 530 and the task user interface components 540, during runtime, the execution of task user interface components 540 and supporting work item user interface components 530 can be synchronized as work progresses. For example, once the user completes a task in the task user interface component 540, the task can be removed from a work items list in the work items user interface component 530, and the next task assigned to the user can be displayed in the task user interface component 540. The foregoing can be accomplished through event notification and coordination by an event engine 570.

The event engine 570 can include background logic operating in the workplace application. The event engine 570 can communicates with a backend workflow engine 580 to retrieve workflow instance information. Based upon the retrieved workflow instance information, the event engine 570 can coordinate the behavior of the task user interface component 540 and the supporting work items user interface component 530 in furtherance of the workflow instance.

First, the event engine 570 can coordinate the work items user interface component 530, the process list user interface component 520, the process progress user interface component 510, and the task user interface component 540 in the course of executing the workflow instance. Once an interacting user has completed work on one page corresponding to one next task in a process in the workflow, the event engine 570 can redirect the interacting user to a next page corresponding to a next task in the process in the workflow. Second, the event engine 570 can provide a persistent storage of runtime workflow data which can be used by a task user interface component 540 or returned to the workflow engine 580. Third, the event engine 570 can log events which occur in the workplace application, which can be used for reporting purposes, or for the dynamic reconfiguration of the collaborative space through personalization features.

At run time, a process in the workflow instance can cycle though a number of states: inactive, running, suspend, completed. A task also can have a number of states: inactive, active and completed. Therefore, the event engine 570 can synchronize with the workflow engine 580 by sending messages to the workflow engine when a task or process state has changed. In more particular illustration, FIG. 6 is a timing diagram illustrating an exemplary process for synchronizing a workflow engine 580 in the system of FIG. 5.

Figure 6:
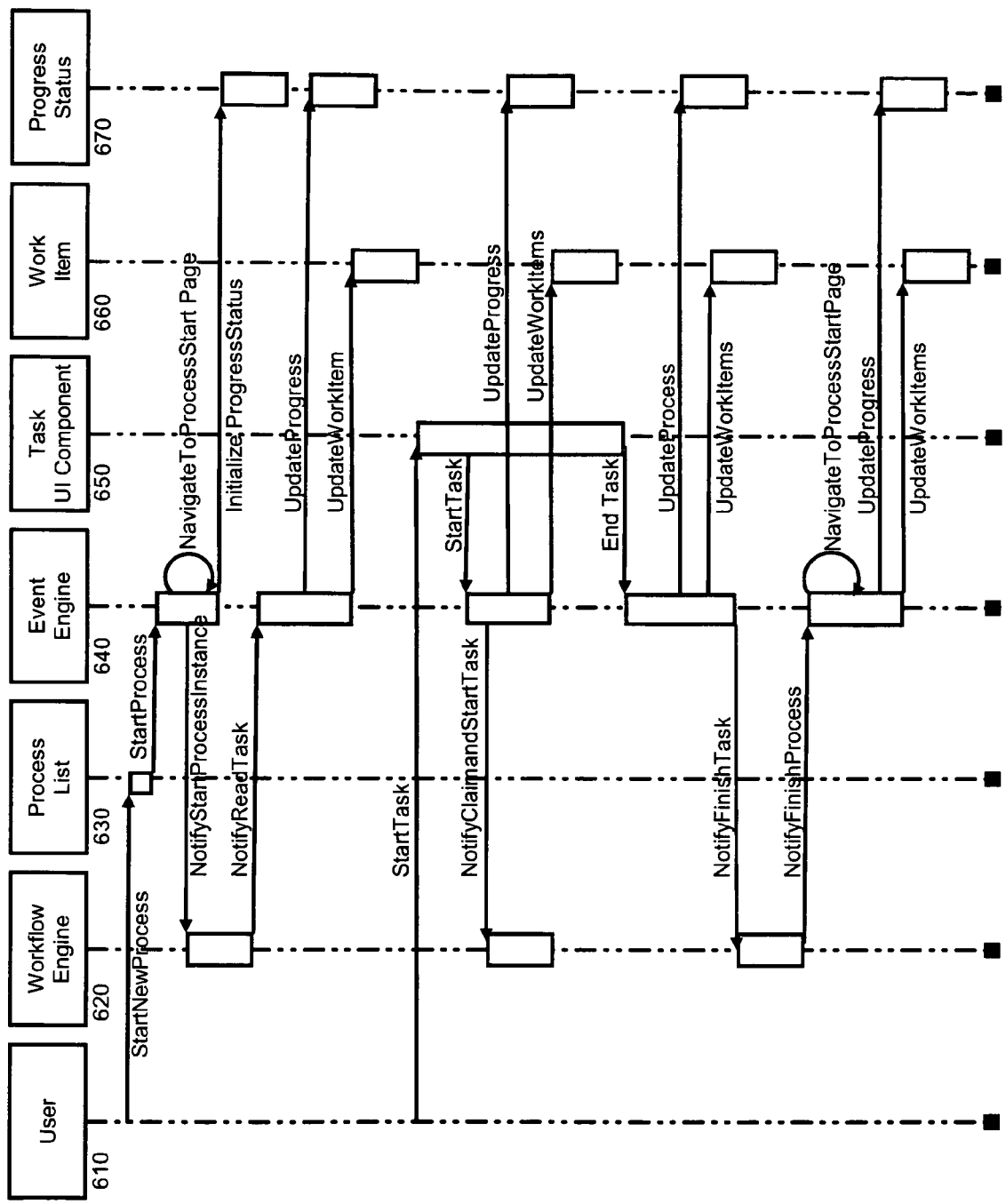

As shown in FIG. 6, the exemplary process includes only a single task. The user 610 can begin by selecting a process from the process list user interface component 630. The process list user interface component 630 can notify the event engine 640 that a new process instance has been initiated by the user 610. The event engine 640 can navigate the collaborative space to the first page of the process which can contain the first task to be executed. The event engine 640 can update the progress status 670 for the process and can notify the backend workflow engine 620 that a process instance has been initiated.

The workflow engine 620, upon receipt of the notification, can update its internal information regarding the process instance, and can assign a set of tasks to the user 610. The event engine 640 can receive the assigned set of tasks, update the progress status 670 of the process and the work items 660, and waits for the user 610 to act. The user 610 can begin work in the workplace, responsive to which the task user interface component 650 can notify the event engine 640 that the user 610 has begun work on a task. The event engine 640 in turn can notify the workflow engine 620 that the task has been activated, and can update the work items 660 and the progress status 670.

When the process completes, the task user interface component 650 can notify the event engine 640 that the user 610 has completed work on a task. The event engine 640 in turn can notify the workflow engine 620 that the task has been completed, and can update the work items 660 and the progress status 670. The workflow engine 620 subsequently can return the next set of tasks assigned to the user 610. The foregoing procedure can repeat for all tasks in the process until no tasks remain. Subsequently, the workflow engine 620 can notify the event engine 640 that the process has completed and the collaborative space can update the progress status 670 and work items 660, while loading the first process page to allow the user 610 to start another process.

Embodiments of the invention can take the form of an entirely hardware embodiment, an entirely software embodiment or an embodiment containing both hardware and software elements. The invention may be implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

We claim:

1. A computer-implemented method for role-based personalization of a collaborative space comprising:
   obtaining, using a computer hardware system, role-based information for an interacting user that has been defined by an underlying business process model in a workflow; and
   generating, in the computer hardware system, the collaborative space utilizing the role-based information, including:
      parsing the workflow to extract a role model;
      generating a collaborative space domain model from the role model;
      selecting a plurality of user interface components based upon the role model, wherein mapping rules are defined to transform role information aggregated in the role model to user interface components for incorporation in the collaborative space domain model, and wherein the mapping rules include user-specified mapping rules between a group of workflow tasks and existing user interface components where existing user interface components exist when the collaborative space is created, and suggested mapping rules obtained by segmenting the workflow based upon role-assignment or a control-flow structure where user interface components do not exist when the collaborative space is created;
      organizing the selected user interface components in the collaborative space; and
      rendering the collaborative space.

2. The method of claim 1, wherein
the generating the collaborative space domain model comprises selecting a plurality of tasks to be performed by the interacting user based upon the role model and incorporating the selected tasks in the collaborative space domain model.

3. The method of claim 1, wherein
segmenting the workflow based upon role-assignment is carried out by decomposing the workflow into segments at a connector connecting tasks for different roles.

4. The method of claim 1, wherein
segmenting the workflow based upon a control-flow structure is carried out by comparing structural features of the workflow to group tasks in the workflow.

5. The method of claim 1, wherein
the selecting of the plurality of user interface components comprises selecting at least
   a task user interface component,
   a work items user interface component,
   a process list user interface component and
   a collaborative tools user interface component
to be disposed in the collaborative space.

6. The method of claim 5, wherein
the selecting of the plurality of user interface components further comprises selecting a progress status user interface component for the workflow.

7. A computer hardware system for role-based personalization of a collaborative space comprising:
   a processor;
   a memory;
   a plurality of user interface components disposed in the collaborative space, each user interface component being selected based upon role information extracted from a workflow;
   a workflow engine coupled to the collaborative space and configured to process the workflow; and,
   an event engine logically disposed, within the processor and between the user interface components and the workflow engine, the event engine configured to
      obtain role-based information for an interacting user that has been defined by an underlying business process model in the workflow; and
      generate the collaborative space utilizing the role-based information, including:
         parsing the workflow to extract a role model;
         generating a collaborative space domain model from the role model;
         selecting a plurality of user interface components based upon the role model, wherein mapping rules are defined to transform role information aggregated in the role model to user interface components for incorporation in the collaborative space domain model, and wherein the mapping rules include user-specified mapping rules between a group of workflow tasks and existing user interface components where existing user interface components exist when the collaborative space is created, and suggested mapping rules obtained by segmenting the workflow based upon role-assignment or a control-flow structure where user interface components do not exist when the collaborative space is created;
         organize the selected user interface components in the collaborative space; and
         render the collaborative space.

8. The system of claim 7, wherein the collaborative space is a workplace.

9. The system of claim 7, wherein the user interface components comprise portlets.

10. The system of claim 9, further comprising
at least one collaboration user interface component disposed in the collaborative space and coupled to an external, supporting service.

11. A computer program product comprising a computer usable storage medium having stored therein computer usable program code for role-based personalization of a collaborative space embodied therein, the computer usable code when executed on a computer hardware system causes the computer hardware system to perform the operations of:
obtaining role-based information for an interacting user that has been defined by an underlying business process model in a workflow; and
generating the collaborative space utilizing the role-based information, including:
parsing the workflow to extract a role model;
generating a collaborative space domain model from the role model;
selecting a plurality of user interface components based upon the role model, wherein mapping rules are defined to transform role information aggregated in the role model to user interface components for incorporation in the collaborative space domain model, and wherein the mapping rules include user-specified mapping rules between a group of workflow tasks and existing user interface components where existing user interface components exist when the collaborative space is created, and suggested mapping rules obtained by segmenting the workflow based upon role-assignment or a control-flow structure where user interface components do not exist when the collaborative space is created;
organizing the selected user interface components in the collaborative space; and
rendering the collaborative space.

12. The computer program product of claim 11, wherein the generating the collaborative space domain model comprises
selecting a plurality of tasks to be performed by the interacting user based upon the role model and
incorporating the selected tasks in the collaborative space domain model.

13. The computer program product of claim 11, wherein segmenting the workflow based upon role-assignment is carried out by decomposing the workflow into segments at a connector connecting tasks for different roles.

14. The computer program product of claim 11, wherein segmenting the workflow based upon a control-flow structure is carried out by comparing structural features of the workflow to group tasks in the workflow.

15. The computer program product of claim 11, wherein the selecting of the plurality of user interface components comprises selecting at least
a task user interface component,
a work items user interface component,
a process list user interface component and
a collaborative tools user interface component
to be disposed in the collaborative space.

16. The computer program product of claim 15, wherein the selecting of the plurality of user interface components further comprises selecting a progress status user interface component for the workflow.

* * * * *